US012534953B1

(12) United States Patent
Davis

(10) Patent No.: US 12,534,953 B1

(45) Date of Patent: Jan. 27, 2026

(54) GARAGE DOOR INSULATION RETENTION KIT AND A METHOD OF RETAINING INSULATION ON A GARAGE DOOR

(71) Applicant: Amzit Dwayne Davis, Newnan, GA (US)

(72) Inventor: Amzit Dwayne Davis, Newnan, GA (US)

( * ) Notice: Subject to any disclaimer, the term of this patent is extended or adjusted under 35 U.S.C. 154(b) by 245 days.

(21) Appl. No.: 18/465,494

(22) Filed: Sep. 12, 2023

Related U.S. Application Data

(60) Provisional application No. 63/428,330, filed on Nov. 28, 2022.

(51) Int. Cl.

| | |
|---|---|
| ***E06B 3/70*** | (2006.01) |
| ***E04B 1/62*** | (2006.01) |
| ***E06B 3/48*** | (2006.01) |

(52) U.S. Cl.

CPC .............. *E06B 3/7001* (2013.01); *E04B 1/62* (2013.01); *E06B 3/485* (2013.01); *E06B 2003/7044* (2013.01)

(58) Field of Classification Search

CPC ................... E06B 3/7001; E06B 3/485; E06B 2006/7044; E06B 3/263; E06B 2006/7049; E04B 1/62

See application file for complete search history.

(56) References Cited

U.S. PATENT DOCUMENTS

| | | | | |
|---|---|---|---|---|
| 5,179,992 A * | 1/1993 | Okarski | E06B 9/40 | 160/90 |
| 5,358,025 A * | 10/1994 | Wood | E06B 9/521 | 160/368.1 |
| 5,507,109 A * | 4/1996 | Rinzler | G09F 21/04 | 40/590 |
| 5,649,390 A * | 7/1997 | Davidson | B44C 5/00 | 52/63 |
| 5,787,677 A | 8/1998 | Bolich et al. | | |
| 5,839,237 A * | 11/1998 | Davidson | E06B 3/7001 | 52/63 |
| 5,876,291 A * | 3/1999 | Dubose | A63B 69/3623 | 473/197 |
| 5,937,587 A * | 8/1999 | Zinbarg | E06B 3/7001 | 52/63 |
| 6,059,005 A * | 5/2000 | Zinbarg | E06B 3/7001 | 160/90 |

(Continued)

FOREIGN PATENT DOCUMENTS

| | | |
|---|---|---|
| AT | 406077 B | 2/2000 |
| AU | 2004100232 A4 | 4/2004 |

(Continued)

*Primary Examiner* — Beth A Stephan

(57) ABSTRACT

A garage door insulation retention kit is provided, comprising at least 24 rubber bands (minimum 3 inches long and ¼ inch wide) and at least 64 linking components, each featuring a central post with hooks on both ends. Each rubber band connects to hooks on 3-4 different linking components. A method for securing insulation to garage doors is also provided. It involves placing insulation on panelled garage doors, drilling holes along the borders of each panel, inserting linking components into the holes, and stretching rubber bands between them to hold the insulation in place across the panel surface.

20 Claims, 7 Drawing Sheets

(56) References Cited

U.S. PATENT DOCUMENTS

| | | | | |
|---|---|---|---|---|
| 6,282,822 | B1 * | 9/2001 | Rinzler | B60J 5/14 160/394 |
| 6,725,898 | B2 * | 4/2004 | Mullet | E06B 3/485 52/784.15 |
| 7,900,682 | B2 | 3/2011 | Calvino, Jr. | |
| 8,851,145 | B2 | 10/2014 | O'Riordan | |
| 2008/0127591 | A1 * | 6/2008 | Tucci | E06B 3/485 52/515 |
| 2009/0272849 | A1 * | 11/2009 | Koefinger | B64C 1/40 29/469 |

FOREIGN PATENT DOCUMENTS

| | | | |
|---|---|---|---|
| AU | 2007216143 | A1 | 3/2008 |
| DE | 19754046 | C1 | 2/1992 |
| FR | 2772825 | A1 | 6/1999 |

* cited by examiner

GARAGE DOOR INSULATION RETENTION KIT AND A METHOD OF RETAINING INSULATION ON A GARAGE DOOR

CROSS-REFERENCE TO RELATED APPLICATIONS

This application claims the benefit of U.S. Provisional Patent Application Ser. No. 63/428,330, filed on Nov. 28, 2022, which is incorporated by reference herein in its entirety.

FIELD OF THE INVENTION

The present invention relates generally to the field of garage doors. More particularly, the present invention relates generally to garage door insulation.

BACKGROUND OF THE INVENTION

With the widespread use of automobiles, people naturally want to protect their cars from the harmful rays of the sun during the summer and the rain and snow during the winter. Thus, garages have been around since the advent of the automobile. One of the most critical components of the garage is the garage door. A garage door provides protection against theft and vandalism. In addition, the exterior of a garage door can be decorated in the same manner as the home thereto and as such, provides a more aesthetically appealing look than an open garage where the cars are visible. In fact, it can provide a home with an appearance that it is larger than it appears by the garage door providing such a continuous appearance. Thus, the exterior appearance and curb appeal of a garage door is prevalent.

In addition to the exterior door, the interior appearance of the garage door can be just as important. Homeowners and home renters use their garage for storage, workshops, entertaining guests, home gyms, studios, mudrooms, and parking spaces. These homeowners are therefore particularly interested in having the interior of the garage door be just as appealing as the exterior.

Most garage doors are one of three kinds, a tilt-up garage door which is one entire panel, a roll-up garage door which is rolled into an overhead roll as the door opens, or the most popular type of garage door, which is a sectional garage door that rolls up into a horizontal orientation into the garage. These sectional garage doors are made up of a frame having panels therein. These panels tend to be made up of lightweight material such as plastic, or lightweight metal such as aluminum. One of the problems associated with sectional garage doors is that they tend to be permeable due to air and the elements to some extent. This is due to the inescapable fact that the sections of the garage door must remain somewhat flexible and separable from each other in order to properly open and close, and as such, some gaps between the panels are inherently present.

Thus, these garages can be drafty and cold, especially in the winter months in the northern parts of the country. In addition, as people enter and exit the garage from an attached home, a draft and the cold are allowed access into the home, thus increasing heating costs. Thus, climate control of a garage can be a real concern for many homeowners and home renters year around, and the application of fiberglass insulation to the inside of the garage door with adhesives is usually the best option to affect such climate control. However, as soon as heat or cold impacts the exterior of the garage door, the adhered insulation may come loose at the corners and fall.

Thus, it is important to completely install the fiberglass garage door insulation by following the instructions and using the mounting hardware that comes with the provided kit. This is especially important since when the garage door is open, compromised adhesive strength and the weight of sagging insulation creates the potential hazard for the insulation to fall, which can affect one's eyes and skin. Fiberglass insulation is known to cause irritation to one's hands when being handled and is dangerous to one's eyes. Thus, the minimization of sagging or falling fiberglass insulation is desired.

Accordingly, there remains a need for a solution to at least one of the aforementioned problems. For instance, there is an established need for a manner of installing garage door insulation that retains the insulation firmly in place. In addition, it would be advantageous to provide a method that assures the insulation remains in place despite being placed in an overhead location for periods of time.

SUMMARY OF THE INVENTION

The present invention can be directed to a garage door insulation retention kit and a method of retaining garage door insulation using the kit. This kit is a solution for one or more garage door insulation mounting system shortcomings. Some of those shortcomings can be providing extra security in the fastening of fibrous garage door insulation to a garage door, avoiding the need for adhesives, and preventing the sagging weight of the fibrous insulation from completely detaching and falling when the garage door is open. In one non-limiting embodiment, the kit described herein can be used with or without the fastening hardware that is included with the purchased garage door insulation kit. The present invention can be individually installed, repaired, removed, transferred, or changed in color per panel or over the entire garage door.

The kit can contain linking components and rubber bands which can be stretched across the garage door panels and connected to the border portions of the garage door panels. The rubber bands can be connected to each other by the use of additional linking components to create a pattern of the rubber bands forming a central diamond surrounded by triangles, the borders of such a pattern being formed by the stretched rubber bands. The method can be cheap, easy and permits for permanent or temporary retention of the insulation in the door panels.

In a first implementation of the invention there can be provided herein a garage door insulation retention kit which can comprise:

- at least twenty-four rubber bands each having a length of at least three inches and a width of at least ¼ of an inch; and,
- at least sixty-four linking components which can comprise a central longitudinal post which can have a hook on opposing ends thereof, and wherein each rubber band can be connected to 3 or 4 different linking components.

In one aspect of the invention, wherein the kit can comprise 48 rubber bands and 128 linking components.

In another aspect of the invention, the rubber bands can have a length of from about 3 to about 12 inches, and a width of from about ¼ of an inch to about ½ of an inch. The rubber bands can of any of the assorted colors in the color spectrum.

In yet another aspect of the invention, wherein the rubber bands can have a thickness of from about ⅛ of an inch to about 5/16 of an inch.

In yet even another aspect of the invention, wherein the linking components can be from about ½ of an inch to about 2 inches in length.

In yet one other aspect of the invention, the garage door insulation retention kit can further comprise for the retention of from 8 to 16 panels of garage door insulation.

In a second implementation of the invention there can be provided herein a method of retaining insulation on a garage door which can comprise:

- providing garage door insulation to a garage door having individual panels, each panel having a border therearound, which border can be made up of two horizontal portions, and two vertical portions;
- drilling holes along the horizontal and/or vertical portions of the border;
- inserting a linking component into each of the drilled holes;
- attaching rubber bands between the linking components such that the rubber bands can extend over a planar portion of the insulation panel.

In a third implementation of the invention there can be provided herein a method of retaining insulation on a garage door which can comprise:

- providing garage door insulation to a garage door having individual panels, each panel having a border therearound, which border can be made up of two horizontal portions, and two vertical portions;
- drilling a corner hole from about ¼ of an inch to about 6 inches from each end of each horizontal portion and a center hole located midway between the corner holes of each horizontal portion;
- inserting a linking component which can comprise a central longitudinal post having a hook end on each opposing end by one of the hook ends into each of the corner holes and each of the center holes;
- attaching a separate rubber band between two of the available opposing hook ends of each linking component such that the rubber bands can be oriented substantially perpendicular to the two horizontal portions of the border, and each of the substantially perpendicular oriented rubber bands have two stretched halves;
- attaching a separate linking component by one hook end to a midpoint of each of the stretched halves of the rubber band oriented between the center holes and by the opposing hook end to a midpoint of one of the stretched halves of each rubber band oriented between the corner holes.

In one aspect of the invention, each panel can be rectangular. In another non-limiting aspect of the invention, the panel can make up the entire interior surface of the door.

In another aspect of the invention, wherein the corner holes and center holes can each be from 1/16 to 7/64 of an inch, preferably from about 5/64 to about 3/32 of an inch in diameter.

In yet another aspect of the invention, wherein the corner holes can be drilled from about 1 inch to about 4 inches, preferably from about 1.5 to about 3.5 inches from each end of each horizontal portion.

In yet even another aspect of the invention, wherein the horizontal portions can be made up of a flat portion that can be flush with an edge of the insulation panel and a lip portion that can meet at a perpendicular right angle to the flat portion and wherein the lip portion can extend from ½ of an inch to about 2 inches over a planar portion of the insulation, and finally, a short inward portion which is parallel to the flat portion and is longitudinally extended in a direction such that it is perpendicularly oriented to the panel of the garage door, all of which together make up the horizontal portions of the border.

In yet one other aspect of the invention, wherein the holes can be drilled through the short inward portions of the horizontal portions in a central part thereof, for example about ⅛ of an inch, from each end of the short inward portion.

In yet even one other aspect of the invention, wherein the insulation panel can be manually pressed into the door panel so as to make room for the drill bit as the holes in short inward portion can be drilled.

In one other aspect of the invention, wherein the method can be a permanent installation method and each of the hook ends of the linking component can be cinched closed after their installation in the corner and center holes and their attachment to the rubber bands. Although such cinched closed linking component can be easily reopened with needle nose pliers, thus, rendering the panels easy to remove and reinstall.

In another aspect of the invention, wherein the method can be a temporary installation and only the hook ends of the linking component which can be in the corner holes and center holes can be cinched and the opposing hook ends can be left uncinched for easy installation and removal of the rubber bands.

In yet another aspect of the invention, wherein the drilling, inserting, and attaching steps can be repeated for each of the panels on the garage door.

These and other objects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

Like reference numerals refer to like parts throughout the several views of the drawings.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1 and/or FIG. 3. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 4:
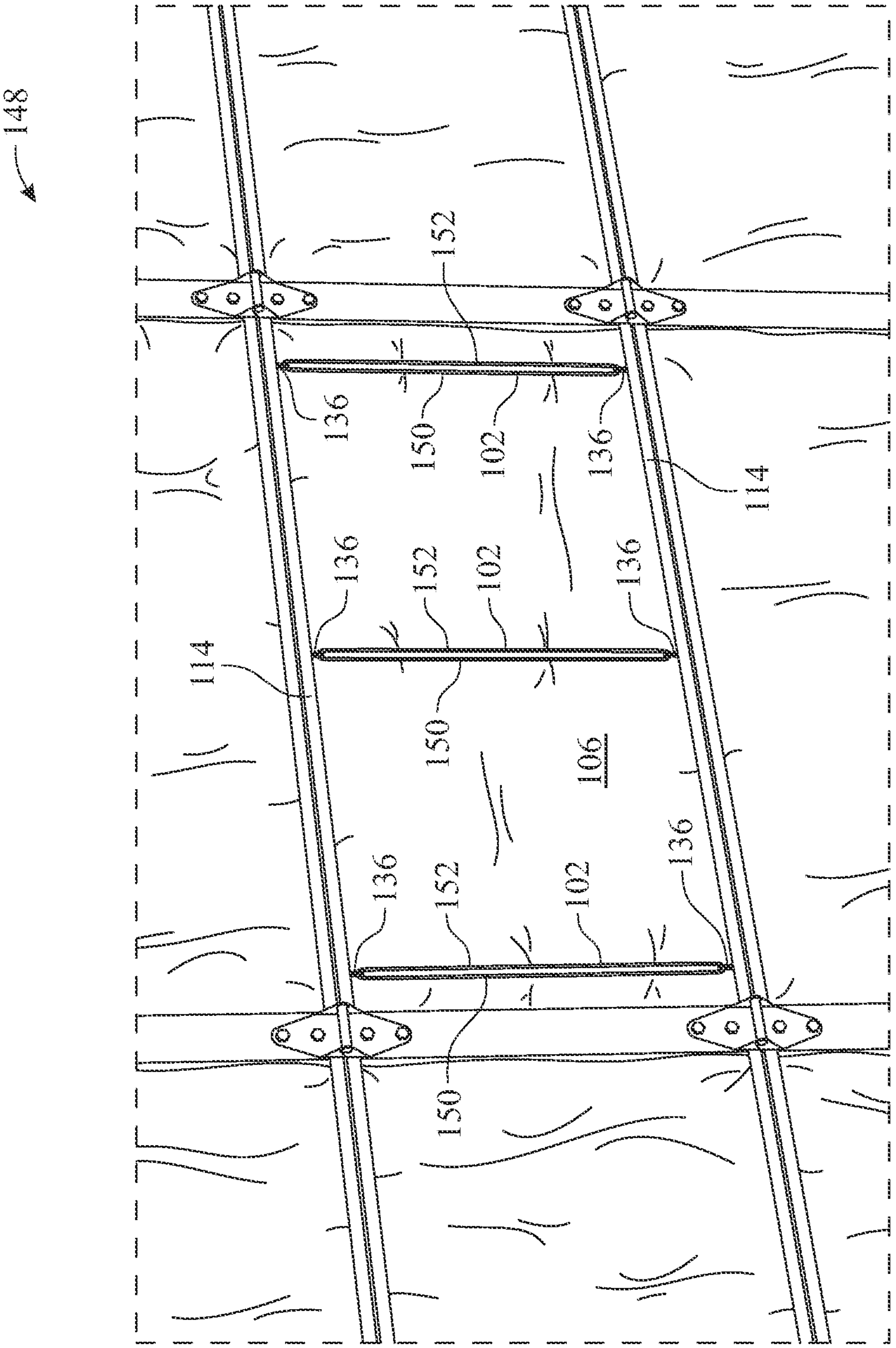
FIG. 4 presents a perspective view of the installation of rubber bands such that they extend over the planar surface of the insulation panel.
Figure 5:
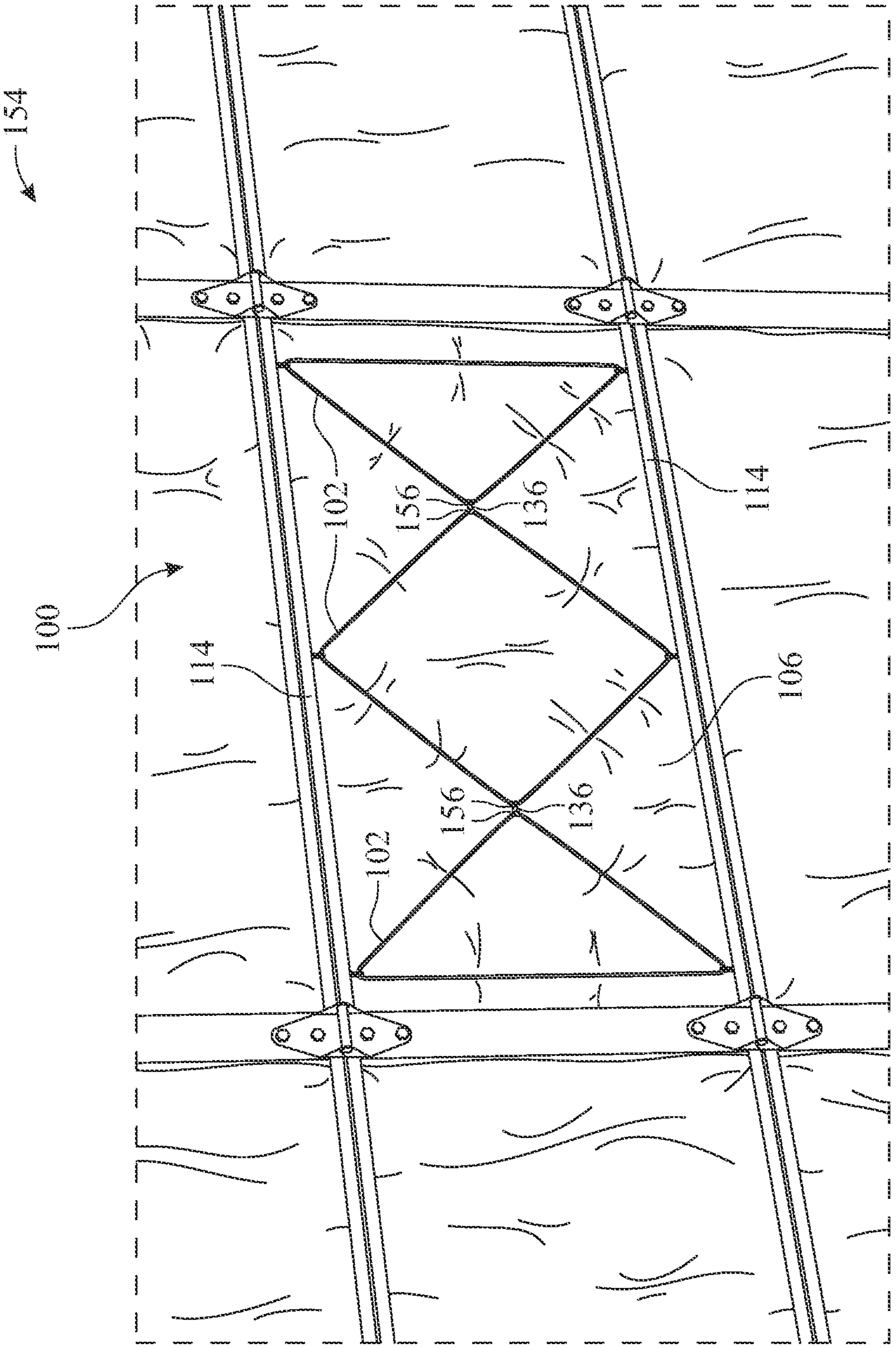
FIG. 5 presents a perspective view of the invention of FIG. 4 having additional linking components connecting the central rubber band with the side rubber bands.

Referring initially to FIG. 5, the kit 100 can contain rubber bands 102 and linking components 136. As shown in FIG. 5, each of the rubber bands 102 in the kit 100 can be connected to three or four linking components 136. The kit 100 can optionally further comprise 8 to 16 panels of garage door insulation 106. The kit 100 can contain enough rubber bands 102 and linking components 136 to retain from 8 to 16 panels of insulation 106. The kit 100 can be used for sectional garage doors such as that shown in FIGS. 1-5 and tilt-up garage doors (not shown). Although sectional garage doors are discussed herein, one skilled in the art could modify the panels of garage door insulation 106 described herein to larger single entire panels which would be sufficient to cover the inside of a roll-up or tilt-up garage door. Such can be accomplished by using a border of those doors to affix the linking components 136 thereto, and then stretching the rubber bands 102 in the kit 100 there across in the same manner described herein. Larger rubber bands 102 could be employed as necessary to cover longer distances of such doors, such as those being from 12 inches long to 36 inches long and the like. Those rubber bands 102 can then be connected by additional linking components 136 as described herein.

Figure 1:
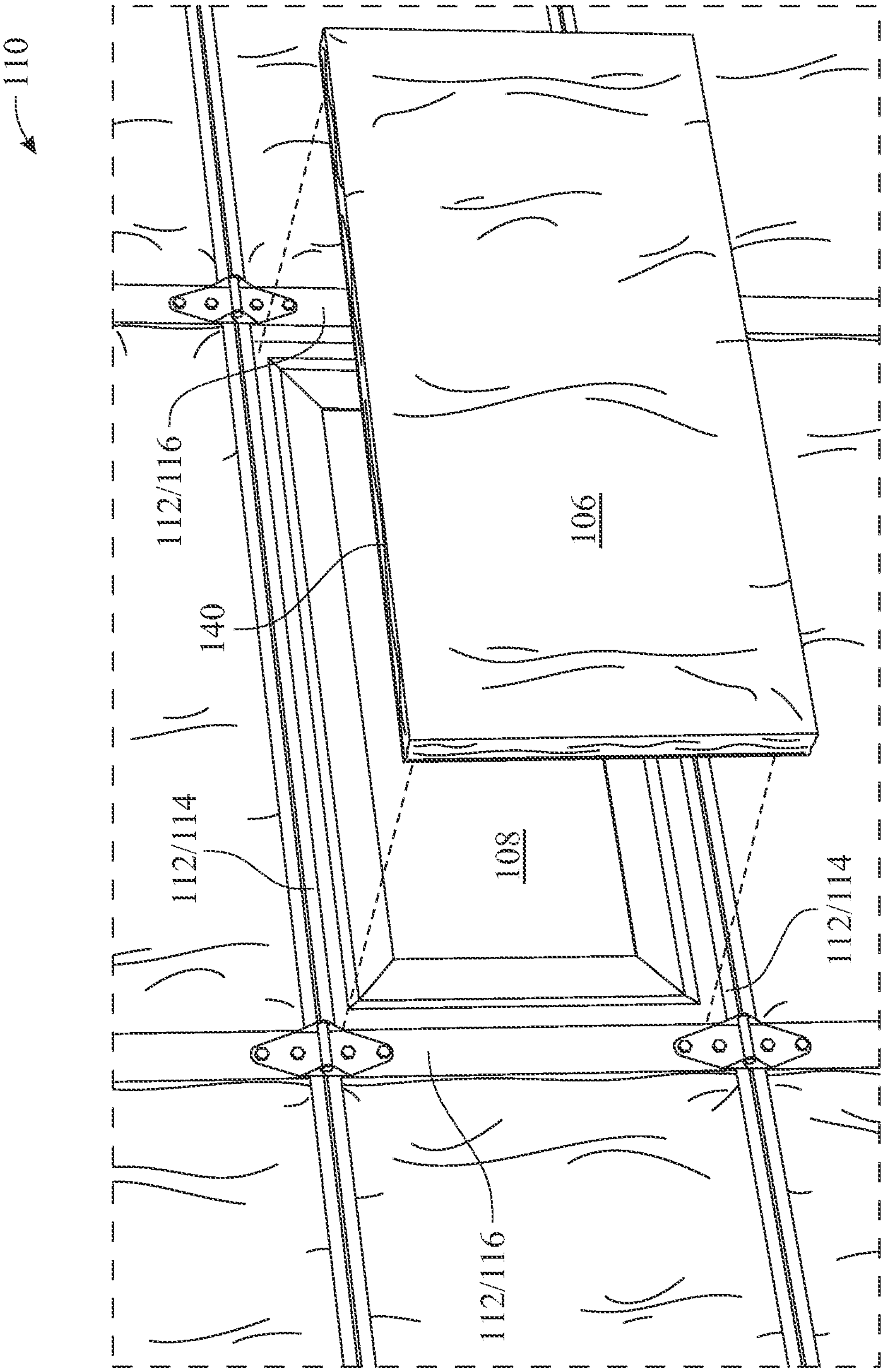
FIG. 1 present a perspective view of an insulation panel being installed on a garage door panel.

Referring to FIG. 1, the terms "retain" or "retention" as used herein can be understood to mean that the insulation panels 106 can be kept flush against the garage door panel 108 in the same manner as when they are installed during repeated raising and lowering of the garage door, for example for at least 200 times of opening and closing the garage door, preferably at least 500 times of opening and closing the garage door and most often at least about 1,000 time of opening and closing the garage door, each "time" being one cycle of opening and subsequently closing the garage door.

Figure 6:
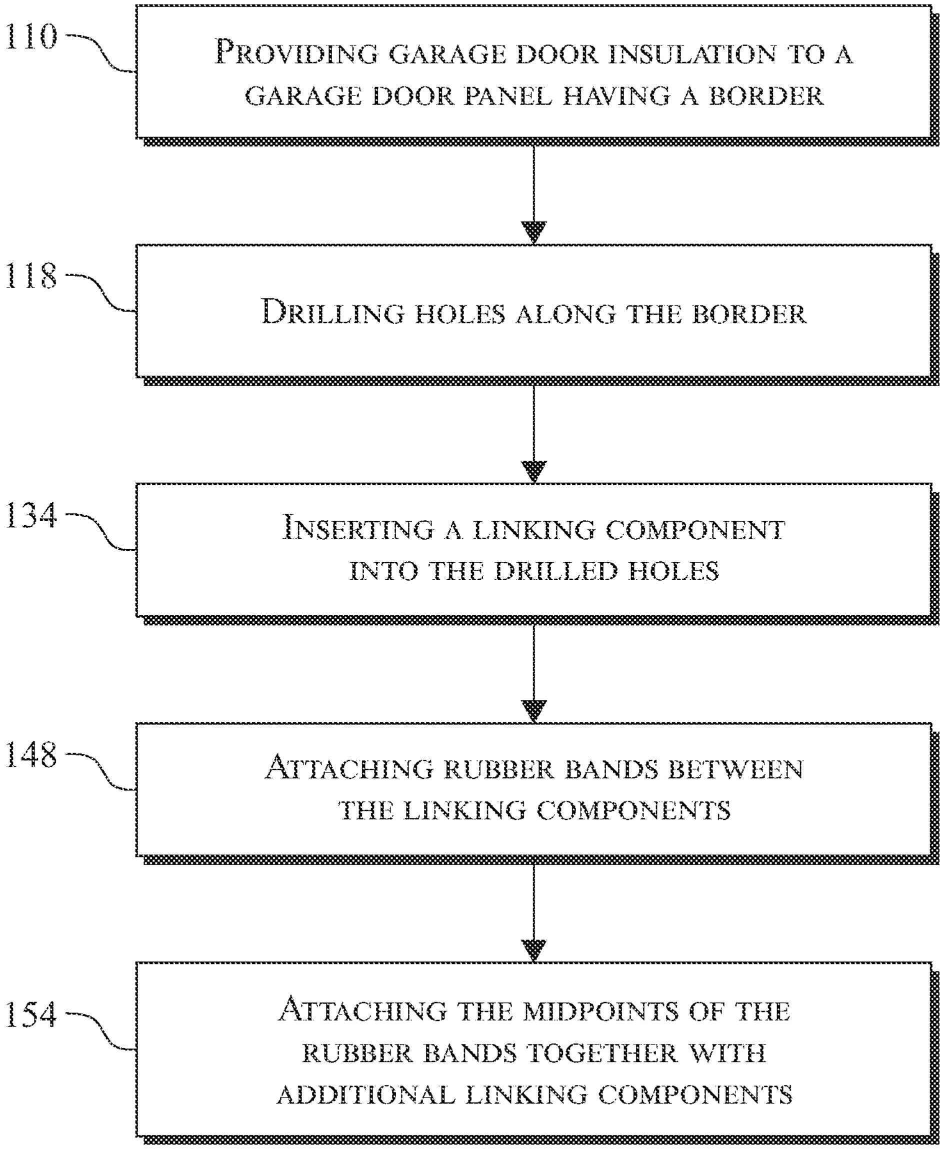
FIG. 6 presents a flow chart of the method of the invention.

Referring to FIGS. 1 and 6, the method of retaining insulation 106 on a garage door can comprise a first step 110 of providing garage door insulation 106 to a garage door (not shown) having individualized panels 108. Each panel 108 can have a border 112 therearound. The border 112 can be made up of two horizontal portions 114 and two vertical portions 116. In one embodiment such as shown in FIGS. 1-5 the horizontal portions 114 and vertical portions 116 form a rectangular shape, although other shapes can be contemplated, such as the non-limiting examples of square, parallelogram, rhombus, trapezoid, triangular and the like. Each garage door (not shown) can contain from about 8 to 16 panels of insulation 106 to cover a corresponding amount of from 8 to 16 garage door panels 108.

Figure 2A:
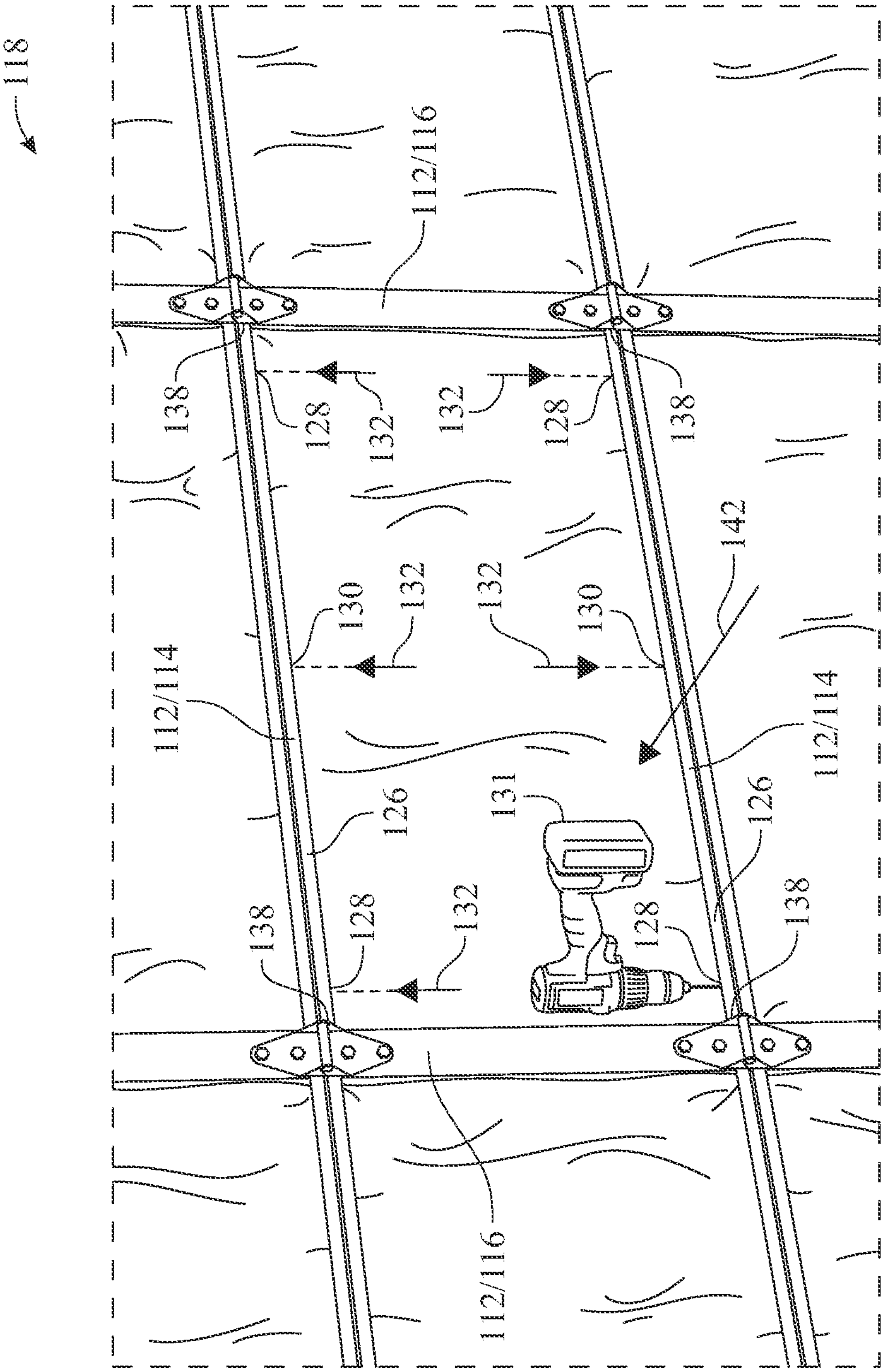
FIG. 2A presents a perspective view of the drilling of holes along the border of the garage door panel.
Figure 2B:
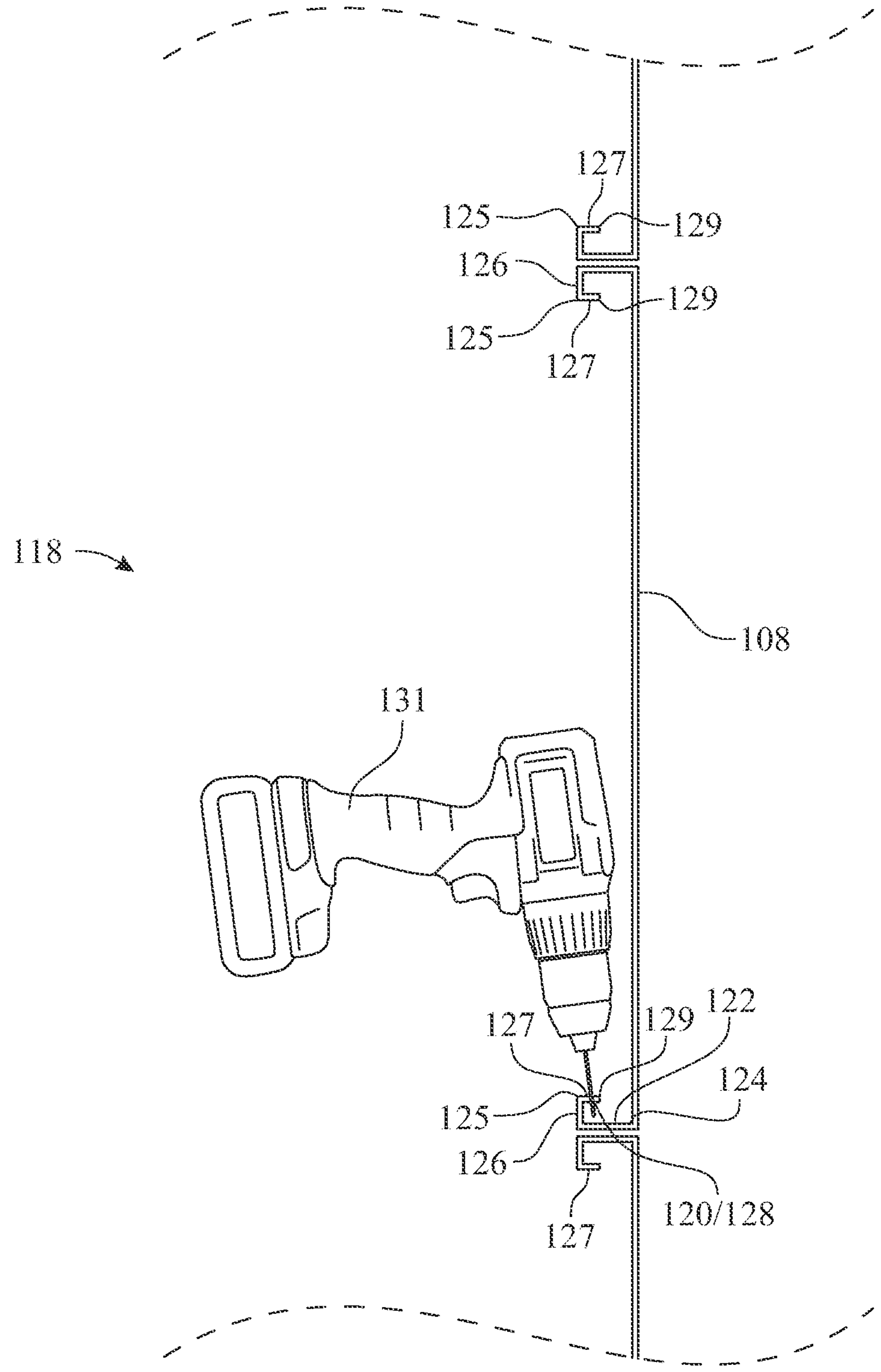
FIG. 2B presents a side cut away view of the drilling of holes along the border of the garage door panel.

Referring to FIGS. 2A. 2B and 6, therein can be shown the next step 118 of drilling of holes 120 along the horizontal portions 114 of the border 112. The holes 120 can be drilled at the above described distances from each ends 138 of the horizontal portions 114. The holes 120 can be drilled along the short inward portion 127 of the horizontal portions 114. The flat portion 122 can be flush with an edge 140 of the insulation panel 106 (see FIG. 1). In FIG. 2B the insulation panel 106 has been removed to show the drilling of the hole 120/128 more clearly. The holes 120 can preferably be drilled at the above mentioned distance from the ends of the short inward portion 127, preferably the hole 120 can be drilled equidistant from the edges 125 and 129 of the short inward portion 127. The lip portion 126 can meet at a perpendicular right angle to the flat portion 122. Preferably the lip portion 126 can extend over the above described distances over a planar portion 129 of the insulation 106 as the horizontal portion 114 of the border 112. The short inward portion 127 can extend about ¼ of an inch in a perpendicular direction towards the garage door panel 108

Referring more specifically to FIG. 2A, the holes 120 can be drilled in the direction of the arrows 132 at the location of corner holes 126 described herein above and also at the location of the central holes 130 described herein above. Preferably to aid in being able to drill the holes 120 in the short inward portion 127, the edges 140 of the insulation panel 106 sometimes may need to be pushed in the direction of the arrow 142 in order to access the short inward portion 127, which can be flush therewith. While there can be four corner holes 128 and two center holes 130 shown being drilled in FIG. 2A, other locations for the holes 120 can be anywhere along the flat portions 122, the lip portions 126, and the short inward portion 127 of the horizontal portions 114 and/or anywhere along the vertical portions 116, provided that the insulation panels 106 can be retained in the garage door panels 108 by the action of the rubber bands 102 as used in the methods described herein. Preferably the holes 120 as described herein, can be drilled with an electric drill 131 using any of the herein described drill bit sizes.

Figure 3:
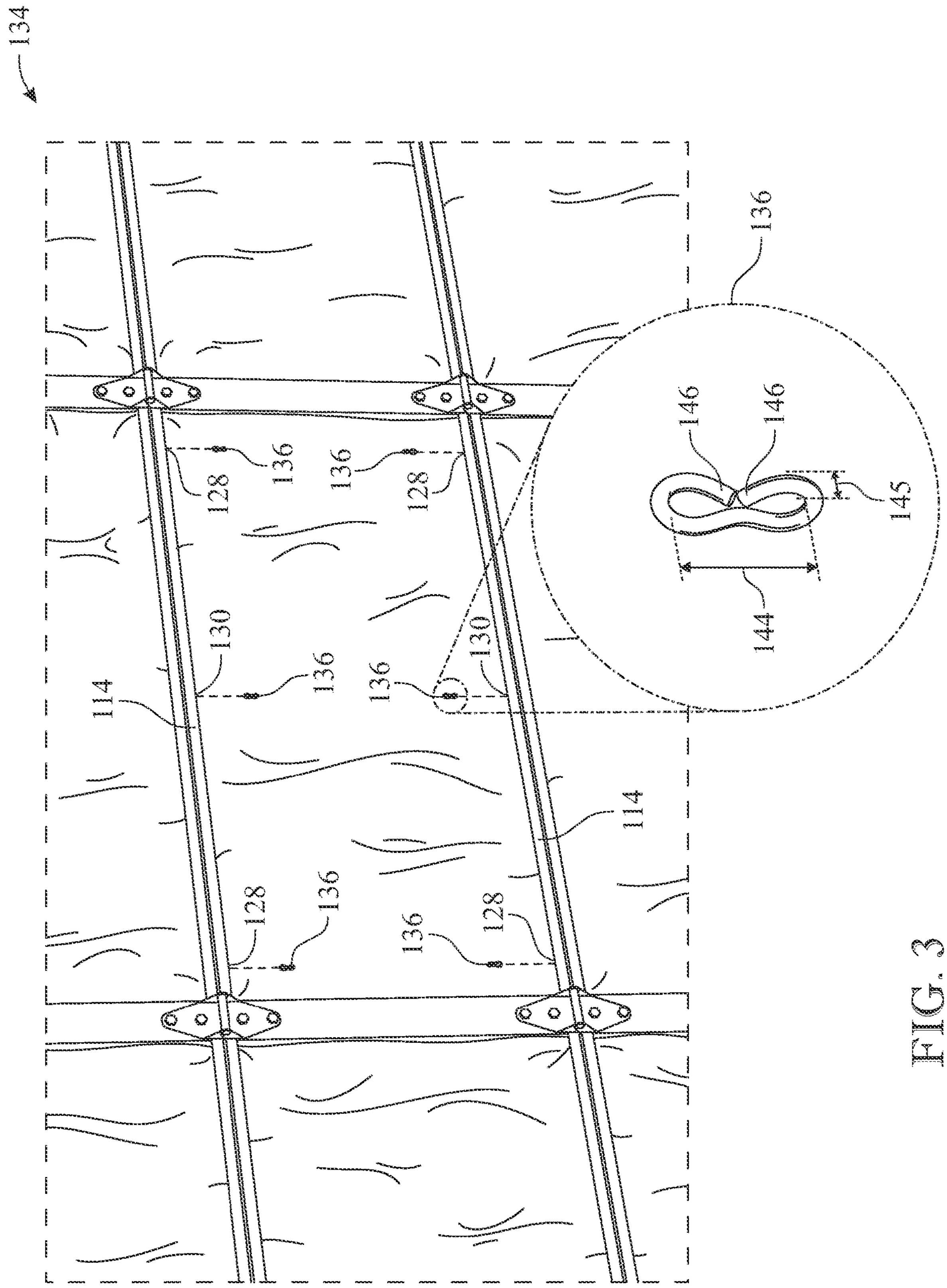
FIG. 3 presents a perspective view of the installation of linking components in the drilled holes with a magnified view of one embodiment of the linking component.

Referring to FIGS. 3 and 6, there can be shown the next step 134 of inserting a linking component 136 into each of the drilled holes 120, i.e., the corner holes 128 and the center holes 130 as shown by the dashed lines in FIG. 3. The linking component 136 can be any piece of hardware that can facilitate a connection between two different components. For example, linking component 136 can have a central length 144 having a hook end 146 on each end of the central length 144. In one non-limiting embodiment the linking component can be a single jack chain link as shown enlarged in FIG. 3, preferably the jack chain link can have a trade size (chain size) of from about 11 to about 16, preferably about 12 to 14, as would be understood by those skilled in the art, and can have a length 144 which is from about ½ of an inch up to about 15⁄16 of an inch, preferably about ⅞ of an inch. The jack chain link 136 can have a diameter 145 of from about 0.062 inches up to about 0.135 inches, most preferably the diameter 145 is about 0.080 inches. The jack chain 136 can be made of any suitable material, but preferably is a metal selected from the group consisting of steel, stainless steel, brass, and aluminum, most preferably black steel. Alternate linking components 136 can be s-hooks, carabiners, quick links, fishing hook connectors, clasp hooks, and the like. In one embodiment, one hook end 146 of the linking components 136 can be hooked into each of the drilled holes 120, more specifically into each of the corner holes 128 and each of the center holes 130, and the remaining opposing hook end 146 of the linking component 136 may be left available for the next step. Preferably, each of the hook ends 146 of the linking components 136 which can be hooked into each of the drilled holes 120, can thereafter be cinched closed, e.g., with a set of needle nose pliers or the like, or alternatively left open.

Referring now to FIGS. 4 and 6, there can be shown the next step 148 of attaching rubber bands 102 between the linking components 136. Such attachment of rubber bands between the linking components is not limited and the rubber bands 102 can connect the available hook ends 146 of any two different linking components 136, provided that in doing so the rubber band 102 can be extended over at least a portion of the planar space of the insulation panel 106. Therefore, linking components 136 bound to any of the corner holes 128 can be connected by a rubber band to any other corner hole 128 or any center hole 130, provided in doing so the rubber band crosses over a portion of the planar portion of insulation panel 106. Likewise, if drilled holes 120 can be made in any of the vertical portions 116 as described as possible above, any linking component 136 connected by one hook end 146 therein can be connected to any other hook end 146 of a linking component 136 hooked on the other end to a hole 120 on the opposing vertical component 116 or to any of the available hook ends 146 present on the horizontal components 114, again provided the use of a rubber band 102 to attach those hook ends 146 results in a stretching of the rubber band 102 over a portion of the planar area of the insulation panel 106.

Referring more specifically to FIG. 4, a separate rubber band 102 can be attached between two of the aforementioned available hook ends 146 of the linking components 136 such that the rubber bands 102 can be oriented substantially perpendicularly to the two horizontal portions 114 of the border 112, and each rubber band 102 can have two stretched halves 150/152. Such an orientation can be provided by hooking a rubber band 102 on one of the available hook ends 146 of one of the linking components 136 and then stretching the same rubber band 102 across the underlying insulation panel 106 to a directly opposing corresponding available hook end 146 of a different linking component 136.

The expression "substantially perpendicularly" as regarding the orientation of the rubber bands 102 can be understood to mean that there may be small variations in the drilling of the holes 120 on each of the horizontal 114 and/or vertical portion 116, and as such, a corresponding hole on the opposing horizontal 114 or vertical portions 116 may not provide for completely perpendicular connection by the rubber bands 102. Such variations may include from 1 degree up to about 10 degrees from perfectly perpendicular, although perfect perpendicular orientation can be included in the expression. It will also be understood herein that when the rubber bands 102 connect linking components 136 on opposing vertical portions 116 the expression substantially perpendicular shall refer to the rubber bands being perpendicular to the vertical portions 116, and likewise, when as shown in FIG. 4, the rubber bands 102 extend from one horizontal portion 114 to the other the original use of substantial perpendicular shall apply as being perpendicular to the horizontal portions 114. Following the hooking of the rubber bands 102 on the available hook ends 146 of the connectors 136, the available hook ends can then optionally be cinched in the same manner described above, i.e., with needle-nose pliers, to provide for a permanent installation method. It will be understood that any cinching described herein can be optionally reversed if desired.

Referring now to FIGS. 5 and 6, there can be shown the next optional step 154 of attaching the midpoints 156 of the rubber bands 102 together with additional linking components 136. Referring more specifically to FIGS. 4 and 5, the stretched half 150 of the rubber band 102 attached between the linking component 136 linking the central holes 130 between the horizontal portions 114 can be attached by its midpoint 156 to a hook end 146 of one linking component 136 and the opposing hook end 146 can be attached to the midpoint 156 of stretched half 152 of the of the rubber band 102 attached between the linking component 136 linking the left hand corner holes 128. Likewise, the stretched half 152 of the rubber band 102 attached between the linking components 136 linking the central holes 130 between the horizontal portions 114 can be attached by its midpoint 156 to a hook end 146 of one linking component 136 and the opposing hook end 146 can be attached to the midpoint 156 of the stretched half 150 of the of the rubber band 102 attached between the linking component 136 linking the right hand corner holes 128. Such an attachment can result in the orientation of rubber bands shown in FIG. 5, i.e., a central diamond shape and one isosceles triangles attached to the diamond shape on both sides.

Since many modifications, variations, and changes in detail can be made to the described preferred embodiments of the invention, it is intended that all matters in the foregoing description and shown in the accompanying drawings be interpreted as illustrative and not in a limiting sense. Furthermore, it is understood that any of the features presented in the embodiments may be integrated into any of the other embodiments unless explicitly stated otherwise. The scope of the invention should be determined by the appended claims and their legal equivalents.

What is claimed is:

1. A garage door insulation retention kit comprising:

at least twenty-four rubber bands each having a length of at least three inches and a width of at least ¼ of an inch; and, at least sixty-four linking components containing a central longitudinal post which has a hook on opposing ends thereof, and wherein each of the rubber bands is connected to 3 or 4 different ones of the linking components.

2. The garage door insulation retention kit of claim 1, wherein the at least twenty four rubber bands comprises about 48 rubber bands and the at least sixty four linking components comprises about 128 linking components.

3. The garage door insulation retention kit of claim 1, wherein the rubber bands each have a length of from about 3 to about 12 inches, and a width of from about ¼ of an inch to about ½ of an inch.

4. The garage door insulation retention kit of claim 1, wherein the rubber bands each have a thickness of from about ⅛ of an inch to about 5/16 of an inch.

5. The garage door insulation retention kit of claim 1, wherein the linking components are each from about ½ of an inch to about 2 inches in length.

6. The garage door insulation retention kit of claim 1, wherein the garage door insulation retention kit further comprises from about 8 to about 16 panels of garage door insulation.

7. A method of retaining insulation on a garage door comprising the steps of:

providing an individual panel of garage door insulation to an individual garage door panel of a garage door, the individual garage door panel having a border therearound, the border being made up of two horizontal portions, and two vertical portions;

drilling holes along the horizontal and/or vertical portions of the border;

inserting a linking component into each of the drilled holes; and, attaching rubber bands between the linking components such that the rubber bands extend over a planar portion of the individual panel of garage door insulation.

8. The method of claim 7, wherein the individual garage door panel is rectangular.

9. The method of claim 7, wherein the individual garage door panel makes up an entire interior surface of the garage door.

10. The method of claim 7, wherein the holes are corner holes and center holes and are each from 1/16$^{th}$ to 7/64$^{th}$ of an inch in diameter.

11. The method of claim 10, wherein the holes are corner holes are drilled from about 1 inch to about 4 inches, from ends of each of the horizontal portions.

12. The method of claim 7, wherein the horizontal portions are made up of a flat portion that is flush with an edge of the individual panel of garage door insulation and a lip portion that meets at a perpendicular right angle to the flat portion, and wherein the lip portion extends from ½ of an inch to about 2 inches over a planar portion of the individual panel of garage door insulation, and, a short inward portion which is parallel to the flat portion and is longitudinally extended in a direction such that it is perpendicularly oriented to the individual garage door panel of the garage door, all of which together make up the horizontal portions of the border.

13. The method of claim 12, wherein the holes are drilled through the short inward portions of the horizontal portions in a central part thereof from ends of the short inward portion.

14. The method of claim 7, further comprising manually pressing the individual panel of garage door insulation into the individual panel of the garage door prior to drilling so as to make room for the drill bit prior to the holes in short inward portion being drilled.

15. The method of claim 10, wherein the method is a permanent installation method and the linking components have hook ends and each of the hook ends of the linking component are cinched closed after their installation in the corner and center holes and their attachment to the rubber bands.

16. The method of claim 10, wherein the method is a temporary installation method and the linking components have hook ends and only the hook ends of the linking component which are in the corner holes and center holes are cinched and opposing hook ends of the linking components are left uncinched for easy installation and removal of the rubber bands.

17. A method of retaining insulation on a garage door comprising:

providing an individual panel of garage door insulation to an individual garage door panel of a garage door, the individual garage door panel having a border therearound, the border being made up of two horizontal portions, and two vertical portions;

drilling a corner hole from about ¼ of an inch to about 6 inches from ends of each of the horizontal portions and a center hole located midway between the corner holes of each of the horizontal portions;

inserting a linking component comprising a central longitudinal post having a hook end on opposing ends thereof one of the hook ends inserted into each of the corner holes and each of the center holes;

attaching a separate rubber band between two of the opposing hook ends of each of the linking components such that the rubber bands are oriented substantially perpendicular to the two horizontal portions of the border, and each of the substantially perpendicular oriented rubber bands have two stretched halves; and, attaching a separate linking component by one hook end to a midpoint of each of the stretched halves of the rubber band oriented between the center holes and by the opposing hook end to a midpoint of one of the stretched halves of each of the rubber bands oriented between the corner holes.

18. The method of claim 17, wherein the individual garage door panel is rectangular.

19. The method of claim 17, wherein the method is a permanent installation method and each of the hook ends of the linking component are cinched closed after their installation in the corner and center holes and their attachment to the rubber bands.

20. The method of claim 17, wherein the method is a temporary installation method and only the hook ends of the linking component which are in the corner holes and center holes are cinched and the opposing hook ends are left uncinched for easy installation and removal of the rubber bands.

* * * * *